3,076,772
PHENOL - UREA - ALDEHYDE - SULFITE LIQUOR ADHESIVE, METHOD OF PRODUCTION, AND PRODUCT MADE THEREFROM
Robert E. Christ, Woodside, Calif., assignor, by mesne assignments, to Diamond Alkali Company, Cleveland, Ohio, a corporation of Delaware
No Drawing. Filed Feb. 19, 1959, Ser. No. 794,254
5 Claims. (Cl. 260—17.2)

This invention relates to a resinous adhesive containing sulfite waste liquor, and which includes a resinous adhesive base compatible with the sulfite liquor and which is capable of retaining the sulfite liquor on the surface of wood. The adhesive is particularly applicable in the manufacture of so-called "particle board" which is a well known article of commerce formed of waste wood particles which may be sawdust, wood splinters or flakes, or mixtures of these particles, adhesively united together under heat and pressure by the adhesive.

The adhesive base hereof has utility itself as a resinous adhesive for various purposes such as in the manufacture of laminated plywood of which there are many types. Such types of adhesives may be extended on the acid side with sulfite waste liquor as is disclosed in United States Patent No. 2,786,008, dated March 19, 1957. However, the sulfite waste liquor which is normally acid when incorporated with various phenolic resins penetrates or soaks into the wood, thereby negating its value as an adhesive in the manufacture of particle board. This is so because in such particle board manufacture, it is necessary that the adhesive be retained on the surface of the wood so that it will fuse and provide its adhesive function when the particles are molded under heat and pressure. The sulfite liquor on the acid side has a great affinity for wood because wood is normally acid reacting and the sulfite liquor originally comes from wood, and therefore has the property of striking through the same. Furthermore, when sulfite liquor on the acid side is used, the wood particles tend to become decomposed.

This invention is designed to overcome the aforementioned problems, and has as its objects, among others, the provision of a resinous adhesive base which is on the alkaline side, i.e., is alkaline, is non-acid tolerant, or in other words, will congeal when acid is added thereto, is compatible with sulfite waste liquor on the alkaline side, i.e., is alkaline, is capable of retaining the sulfite waste liquor on the surface of the wood when sprayed thereon, thus rendering the sulfite waste liquor suitable as an adhesive in combination with the resinous adhesive base compatible therewith. By virtue of the extension of the resinous adhesive base with the sulfite waste liquor, economy is effected because the sulfite waste liquor is much less costly than the adhesive base; at the same time, a very good adhesive is provided which forms a strong bond between particles of wood in the manufacture of the aforementioned particle board.

In general, the resinous adhesive base of this invention is the product resulting from the reaction of urea, phenol and formaldehyde in the presence of an alkali metal base catalyst, desirably sodium hydroxide, in molar ratios which presently have been found to be critical. Also, the presence of urea has presently been found to be critical.

The following is an example of the proportions of the constituents employed to form the resinous adhesive base in approximate parts and percent by weight, and molar proportions:

Example 1

|  | Parts by Weight | Moles |
|---|---|---|
| Urea (Market Grade) | 3.6 | 1.0 |
| Phenol (90%) | 31.5 | 5.0 |
| Formaldehyde (37%) | 58.9 | 12.0 |
| Sodium Hydroxide (50%) | 6.0 | 1.25 |
|  | 100.0 |  |

The molar proportions have been found critical and should not vary more than plus or minus 3%. With respect to the parts by weight of the constituents, namely, 90% phenol, 37% formaldehyde and 50% sodium hydroxide, water is the remainder, thus making the total water content approximately 43.2 percent and parts by weight. This water content is not particularly critical but the final sulfite waste liquor extended base resin should have a solids content, namely, the weight of all other constituents except water of about 43 to 48% by weight for reasons which will be explained later. Therefore, for convenience, the water content of the above formulation is chosen to provide a final water content of the base resin of about 43% to 48% by weight so as to provide the desired final water content of the extended base resin when mixed with sulfite waste liquor of substantially the same consistency. However, the water content of the base resin may be greater or smaller, and adjustment can be readily effected after completion of the reaction thereof to provide the desired solids content of the base resin.

In effecting reaction of the constituents, a conventional refluxing vessel equipped with heat and cooling means, as is commonly employed in the manufacture of phenolic type adhesive resins, is utilized. The urea, phenol and formaldehyde are charged into the vessel with stirring. The pH of the solution is adjusted to approximately 8.2 with a small amount of the 50% sodium hydroxide, which will approximate about $\frac{1}{25}$ of the total amount of the 50% sodium hydroxide of the example. At this point, the adjustment may be such that the pH may vary from 8.0 to 8.4. The purpose of the additional small amount of alkali is to have sufficient present to start the reaction. Next, the mixture is heated to the point where an exothermic reaction is initiated among the constituents. A suitable temperature for initiating the reaction is about 60° C.

The temperature of the reactants is then gradually increased by application of heat until the mixture has a viscosity at 25° C. of approximately A on the well known Gardner-Holdt scale. This is accomplished by gradually increasing the temperature over a period of about two hours until the temperature reaches the range of 90° C. to 95° C. After arriving at this temperature of 90° C. to 95° C., the temperature is desirably maintained for a period of about one-half hour with the viscosity remaining at A.

The remainder of the 50% aqueous sodium hydroxide solution is then added. Before the addition of the remaining sodium hydroxide with the additional water in which it is dissolved, the mixture is cooled down to a point at which the sodium hydroxide may be added without too vigorous a reaction occurring. A suitable temperature to which the solution is cooled is about 50° C. Finally, the mixture is mildly heated with the temperature gradually raised over a period of about one hour to complete the reaction. The final temperature is about 70° C. At this point, the application of heat is terminated.

The final base resin solution has a solids content of approximately 45% by weight, a viscosity at 25° C. on the Gardner-Holdt scale of approximately G–H, and a pH of approximately 10.1. However, a final pH in the range of 9.8 to 10.4 is suitable.

Such urea-phenol-aldehyde base resin solution has the marked physical properties of being compatible with alkalized sulfite waste liquor, and also when mixed with such alkaline sulfite liquor, of retaining the liquor on the surface of wood. However, it can be used per se for cementing or adhering fibrous products under heat and pressure. It is believed that when combined with the sulfite liquor, it forms a complex therewith for some reason which is presently unknown.

Any suitable sulfite waste liquor can be employed, but the type of liquor found most desirable is ammonium-base sulfite liquor. This liquor as is described in the aforementioned Patent No. 2,786,008, is a waste product obtained from the normal operation of ammonium-base wood pulping process. It is derivable from the pulping of wood of various species of coniferous and deciduous trees.

In the process of pulping the wood, the wood chips are cooked under pressure with a cooking liquor containing essentially ammonium bisulfite, sulphur dioxide and water; and the resultant sulfite waste liquor is separated from the wood. A preferred type of liquor is "orzan" having a solids content of about 50% by weight and the remainder water. The percent by weight of total solids is as follows:

| | |
|---|---|
| Lignin sulphonic acids | 55.0 |
| Alkali-liberated ammonia | 3.0 |
| Reducing sugars as glucose | 17.0 |
| Sulfate | 2.0 |
| Sulfated ash | 2.0 |
| Miscellaneous | 21.0 |
| | 100.0 |

The miscellaneous constituents comprise wood extractives, waxes, fatty acids, sterols, and the like.

In mixing the aqueous solution of sulfite waste liquor with a solution of the base resin, the pH of the sulfite waste liquor is first adjusted with alkali metal hydroxide to the range of 9.8 to 10.4 which is the desirable pH range of the base resin solution. Since the two are of substantially the same pH they are completely compatible and form a homogeneous solution when intermixed.

The final waste sulfite liquor extended resinous adhesive base should desirably have a total solids content of at least 43% by weight and not over 48% by weight, although the latter percentage is not particularly critical. Below 43% by weight solids, there may be some penetration into the wood; above 48% by weight solids, the mixture may be too viscous to spray.

As previously mentioned, the desired type of ammonium base sulfite liquor, preferably orzan, is generally sold with 50% total solid contents, and to provide the consistency of the final extended solution of 43% to 48% by weight, the base resin solution and 50% "orzan" solution can be mixed together in approximately equal quantities with a plus or minus 3% variation for each solution. The mixing procedure is not particularly critical but it is desirable to effect the same at a slightly elevated temperature with vigorous stirring to insure uniformity within a relatively short time of mixing. A suitable temperature of mixing is about 40° C. No exothermic heat of reaction is evolved as a result of the mixing, and if desired, the mixing may be effected at room temperature. At about 40° C., and with gradual addition of the base resin to the sulfite liquor having the pH range noted, the mixing can be effected with vigorous stirring in about a half hour to insure that the batch is perfectly homogeneous.

Although the pH of final sulfite liquor extended resin base may vary from 9.8 to 10.4 with good results, best results are obtained when the pH thereof is approximately 10.2. As noted above, the preferred pH of the resin base solution is approximately 10.1. Therefore, sufficient additional alkali is desirably added beforehand to the sulfite liquor to bring the pH of the extended resin base to the optimum desired, namely a pH of 10.2. With approximately equal parts by weight of the entire amount of base resin solution prepared as described, and the 50% waste sulfite liquor solution "orzan," the sulfite liquor pH can be adjusted to provide the final extended resin base with a pH of about 10.2 by addition to the liquor of about 1% by weight of 50% sodium hydroxide solution based upon the weight of the 50% solution of sulfite liquor.

The preferred solids content of the sulfite liquor extended base resin solution is desirably 45% by weight; since the base resin of Example I has a 45% by weight solids content and the "orzan" a 50% by weight solids content, additional water is desirable to provide the final 45% by weight solids content of the sulfite liquor extended base resin. The following are the desired proportions of constituents for mixing with the base resin solution prepared in accordance with Example I in percent and parts by weight.

*Example II*

| | Parts by weight |
|---|---|
| Base resin solution prepared by Example I (pH 10.1—solids content 45%) | 50.0 |
| Sulfite liquor (orzan) with 1% addition of 50% sodium hydroxide solution (solids content 50%) | 45.0 |
| Additional water | 5.0 |
| | 100.0 |

If desired, the sodium hydroxide for bringing the sulfite liquor to the desired pH can be incorporated in the additional water.

The resultant sulfite liquor extended base resin solution has the following approximate properties:

| | |
|---|---|
| Solids content _____percent by weight__ | 45 |
| Viscosity, Gardner-Holdt, at 25° C. | J to N |
| pH | 10.2 |

Both the base resin and the sulfite liquor extended base resin are infinitely dilutable in water.

In making particle board with the sulfite liquor extended base resin, the conventional procedure is employed that is common to the industry. The wood particles are thoroughly mixed in a tumbler and while they are being mixed, they are thoroughly sprayed with the sulfite liquor extended resin in an amount of about 4 to 5% by weight base on the total weight of the wood particles. Then, the thus sprayed wood particles are molded under the usual heat and pressure to provide the finished particle board product.

Although phenol is the preferred product for incorporating in the reaction, other monohydric derivations may be employed instead and in chemically equivalent amounts, such as meta and para cresols. Therefore, the term "phenol" is used in a generic sense.

Formaldehyde is preferred but other equivalent aldehydes, such as paraformaldehyde and acetaldehyde may be utilized.

Sodium hydroxide is the preferred alkali metal hydroxide but potassium hydroxide and lithium hydroxide may be employed in its place in chemically equivalent amounts.

I claim:

1. An aqueous adhesive solution resulting from the mixture of substantially equal parts of (A) a non-acid tolerant, aqueous resinous adhesive solution extended with (B) an alkaline aqueous solution of sulfite waste liquor wherein solution (A) consists essentially of the product resulting from the simultaneous reaction of the following constituents in the following approximate molar ratios:

|  | Molar ratio |
|---|---|
| Urea | 1.0 |
| Phenol | 5.0 |
| Formaldehyde | 12.0 |
| Sodium hydroxide | 1.25 | said solution having a pH of approximately 9.8 to 10.4, a viscosity of approximately G–H on the Gardner-Holdt scale; and wherein solution (B) has a pH of approximately 9.8 to 10.4 and consists essentially of water and sulfite waste liquor, the solids contents of the respective solutions (A) and (B) being approximately equal, and said mixture of solutions (A) and (B) having a pH of approximately 9.8 to 10.4, and a solids content of approximately 43 to 48% by weight.

2. The extended solution of claim 1 in which the sulfite waste liquor is an ammonium-base liquor.

3. Particle board consisting of wood particles adhesively united together by the resinous composition of claim 1.

4. The method of making particle board which comprises spraying wood particles with the resinous composition of claim 1 while thoroughly mixing the particles, and then molding the resultant mixture under heat and pressure.

5. The method of preparing an alkaline aqueous solution of a resinous adhesive base compatible with sulfite waste liquor and capable of retaining said sulfite liquor on the surface of wood which comprises forming an aqueous mixture consisting essentially of the following constituents in the following molar proportions

|  | Moles |
|---|---|
| Urea | 1.0 |
| Phenol | 5.0 |
| Formaldehyde | 12.00 | incorporating a small amount of an alkali metal hydroxide to provide a pH of approximately 8.0 to 8.4, heating said mixture to initiate an exothermic reaction among said constituents, gradually increasing the temperature by application of heat until the mixture has a viscosity of approximately A on the Gardner-Holdt scale, adding water and an alkali metal hydroxide in an amount to make the total alkali metal hydroxide approximately 1.25 moles, and mildly heating the mixture to complete the reaction to provide an aqueous resinous adhesive base solution having a viscosity of approximately G–H, and a pH of 9.8 to 10.4, mixing said base solution with approximately an equal amount of an aqueous solution of said sulfite liquor having a pH within the range from about 9.8 to 10.4, the total solids content of the combined solution being approximately 43 to 48% by weight.

References Cited in the file of this patent

UNITED STATES PATENTS

| 1,717,600 | Bender | June 18, 1929 |
| 2,068,926 | Nevin | Jan. 26, 1937 |
| 2,150,697 | Nevin | Mar. 15, 1939 |
| 2,205,427 | Loos | June 25, 1940 |
| 2,228,837 | Maisch | Jan. 14, 1951 |
| 2,585,977 | Uschmann | Feb. 19, 1952 |
| 2,622,979 | Keim | Dec. 23, 1952 |
| 2,786,008 | Herschler | Mar. 19, 1957 |
| 2,794,790 | Marshall et al. | June 4, 1957 |
| 2,891,918 | Uschmann | June 23, 1959 |

OTHER REFERENCES

Ellis: "Chemistry of Synthetic Resins," volume I, page 343, Reinhold Publishing Company, New York (1935).